Aug. 9, 1932.  R. C. FRYER  1,871,170
ELECTRIC CURRENT CONSUMPTION SYSTEM
Filed June 11, 1930  2 Sheets-Sheet 1
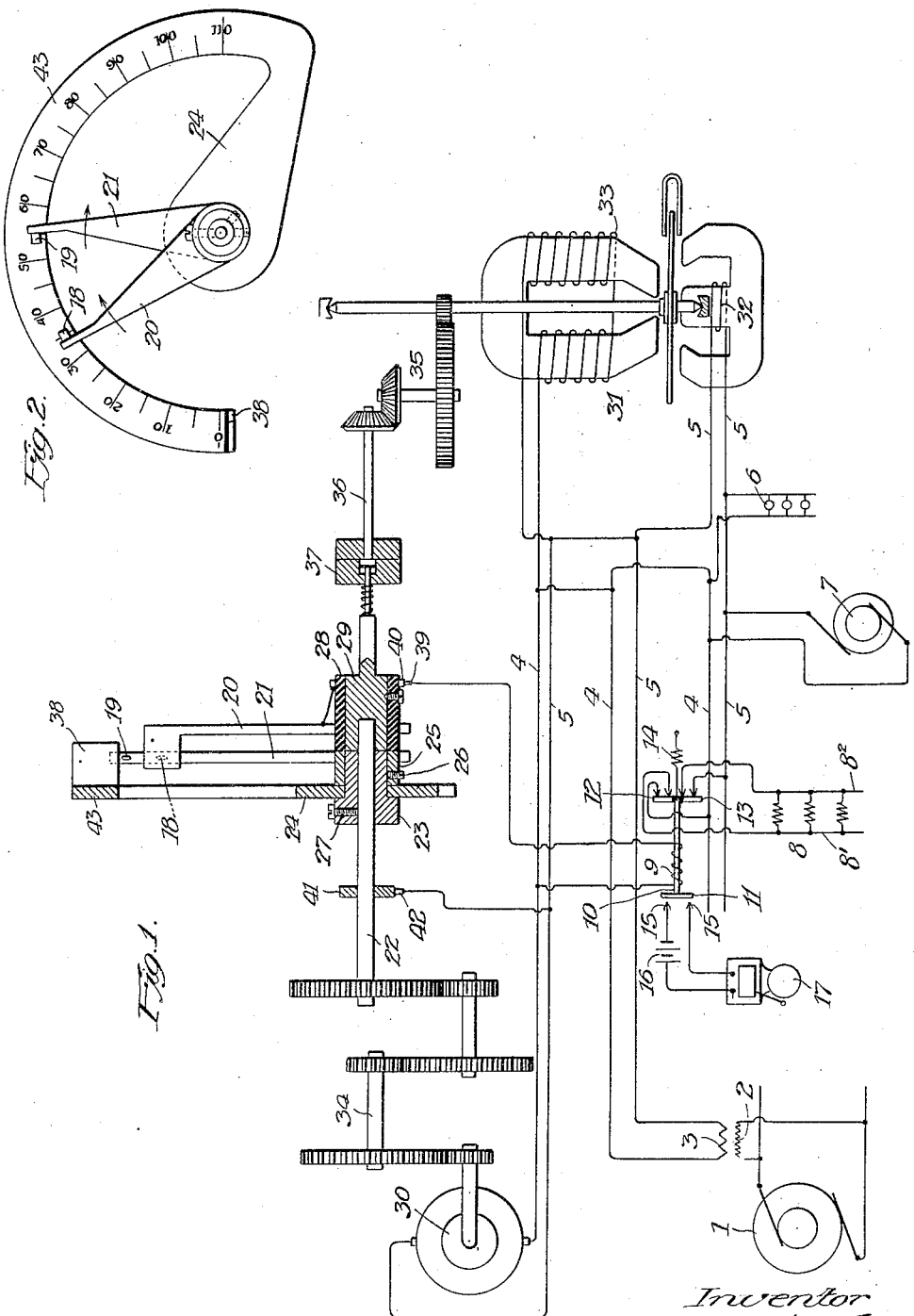
Inventor
Roy C. Fryer
By G. L. Bragg
Atty.

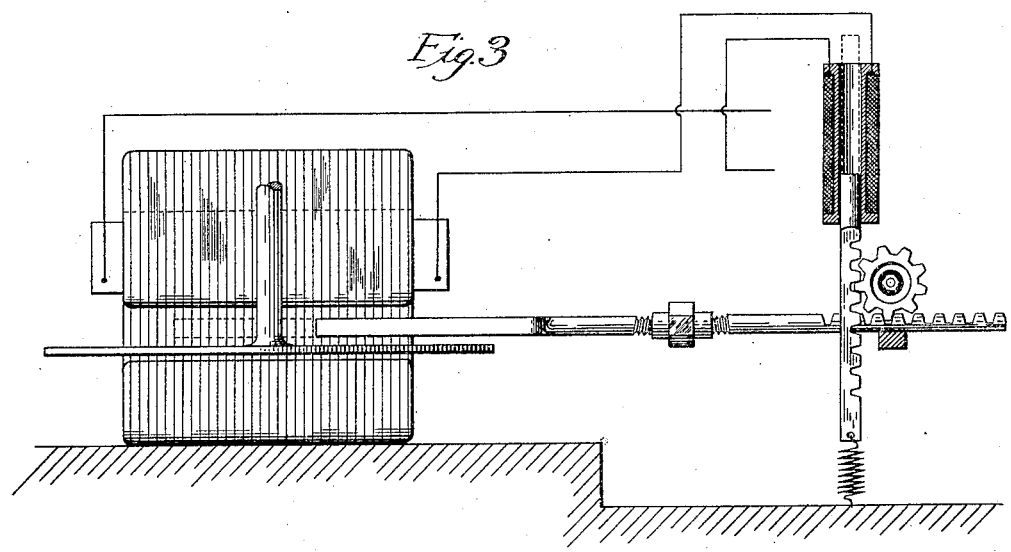

Patented Aug. 9, 1932

1,871,170

UNITED STATES PATENT OFFICE

ROY C. FRYER, OF CINCINNATI, OHIO, ASSIGNOR TO DUNCAN ELECTRIC MANUFACTURING COMPANY, OF LAFAYETTE, INDIANA, A CORPORATION OF ILLINOIS

ELECTRIC CURRENT CONSUMPTION SYSTEM

Application filed June 11, 1930. Serial No. 460,535.

My invention relates to electric current consumption systems and is inclusive of a responsive device which is operative when the current consuming load reaches a predetermined maximum. This responsive device is preferably capable of reducing the load to prevent it from exceeding the predetermined maximum, and of manifesting a signal, preferably an audible signal. A controller is employed for the responsive device, this controller being inclusive of two cooperating members, each driven by a motor individual to it. One of these motors is load controlled, to operate proportionately to the wattage or to the volt-amperes, as may be desired. The other has a fixed law of operation to operate independently of the wattage or volt-amperes and preferably operates at a constant speed. Said members are relatively disposed to be brought into and out of cooperating relation according to the relative speeds of said motors. The indicator which is operated by the responsive device is inclusive of two cooperating members, each motor having one of said members individual thereto and operable thereby. In the preferred embodiment of the invention, the aforesaid controller members also include said members of the indicator. These members are desirably provided with electrical contacts which are engaged, when the load reaches a predetermined maximum, to close circuit through the aforesaid responsive device to remove a part of the load to prevent the load from exceeding the predetermined maximum and to manifest a signal.

I will explain my invention more fully by reference to the accompanying drawings in which Fig. 1 is a diagrammatic view illustrating one embodiment of the invention; and Fig. 2 is a view in elevation of a part of the mechanism. Fig. 3 is a diagrammatic view illustrating a load controlled motor operating proportionately to the volt-amperes and which may be substituted in Fig. 1 for the load controlled motor operating proportionately to the wattage. The motor of Fig. 3 is more fully illustrated and described in the patent to Gordon R. Shuck of October 15, 1929, bearing number 1,731,941.

I have illustrated a single phase alternating current generator 1 as the prime source of current, though it is to be understood that the invention is not to be limited to any particular form of current employed. This generator is in circuit with a primary 2 of a transformer whose secondary 3 is connected between the sides 4 and 5 of a load circuit. The load may be of any suitable character, the load illustrated being inclusive of a group of incandescent lamps 6, a motor 7 and an electric furnace 8. A portion of the load, such as the furnace 8, may be associated with the responsive device, whereby this load portion may be excluded from circuit when the predetermined maximum load has been reached. This responsive device is controlled in accordance with my invention, as will more fully hereinafter appear. The responsive device shown is in the form of a solenoid whose winding 9 is in a normally open bridge between the sides of the load circuit and whose core 10 carries three contact bars 11, 12 and 13. The contact bars 12 and 13 have normal contacts which are included in the sides 8', 8² of the branch circuit containing the load portion 8, the spring 14 maintaining the contact bars 12 and 13 in engagement with their normal contacts. The contact bar 11 has two complemental contacts 15 that are included in a normally open local circuit with a battery 16 and a signal device such as a bell 17. When the maximum load has been reached, the circuit of the winding 9 is established, as will later appear, whereby the solenoid core 10 is drawn inwardly against the force of the spring 14 to remove the load portion 8 and establish the circuit of the signal bell 17.

The switching device which is employed to cut the solenoid winding 9 into and out of circuit is preferably inclusive of two contact members 18 and 19 which are carried at the outer ends of metallic arms 20 and 21 that are independently rotatable upon a common axis. This common axis is defined by a metallic shaft 22 upon which is secured a metallic sleeve 23 which constitutes the hub of a metallic arm 24 which is in fixed relation with the arm 21. The latter arm has a metallic hub 25 which is coaxial with the hub 23. The hub 25 is held in normally fixed relation with the hub 23 by the set screw 26 and both hubs are, together, fastened to the shaft 22 by the set screw 27. The metallic arm 20 is carried upon a hub inclusive of a sleeve of insulation 28 and a metallic core 29 which is journaled upon the shaft 22. The shaft 22 is driven at a constant speed by some suitable constant speed motor such as the synchronous motor illustrated at 30. The hub portion 29 of the arm 20 also constitutes a shaft section which is driven by another motor 31 having current and pressure windings 32 and 33, whereby this motor is operated proportionately to the wattage. Suitable speed reduction gearing 34 is interposed between the motor 30 and the shaft 22 and suitable speed reduction gearing 35 is interposed between the motor 31 and the shaft section 36 which is complemental to the shaft section 29. These two shaft sections are normally flexibly connected by a suitable friction clutch 37 which permits the arm 21 to hold the arm 20 if the shaft sections 36 is turning faster than the shaft 22. If the arm 20 is turning materially slower than the arm 21 it is finally engaged by the pick up device 38 which travels with the arm 24, the friction clutch 37 then permitting the two arms to travel together.

When the load reaches the predetermined limit, the watthour motor 31 moves the contact 18 into engagement with the contact 19 whereby the circuit through the responsive device 9 is closed. This circuit may be traced from the load side 4 through the responsive device winding, the brush 39, the collector ring 40 on the insulating sleeve 28, the arm 20 which is electrically connected with this ring, the contact 18, the contact 19, the metallic arm 21, the shaft 22 which is in electrical connection with this arm, a collector ring 41 and a brush 42 to the load side 5. The responsive device will be operated as hitherto set forth to disconnect a portion of the load and to cause the manifestation of a signal device 17.

The scale 43 is arcuate, is coaxial with the shafts 29, 36 and 22 and is provided with divisions for readily observing its speed with respect to the arm 20. The divisions of the scale 43 are purely arbitrary and do not indicate wattage, or average KW. or average Kv—a or any such like quantity. Their function is merely to aid an observer in determining whether the arm 20 or the scale 43 is rotating the faster, and this in turn indicates to the observer whether the load is such that the responsive device 9 is likely to be operated in the near future.

The time lag of the responsive device 9 may be regulated by the adjustment of the contact arm 21 with respect to the shaft that drives this contact arm. The ratios of the gearing may be varied to limit the demand as desired. The following is a table showing some possible gear ratios upon an alternating circuit of 5 amperes, 100 volts and 60 cycles, the wattage motor 31 having twenty-five R. P. M. and the synchronous motor 30 having twelve hundred R. P. M.

| Demand limit expressed in per cent of full load rating of meter | Gear reduction between motor 31 and contact arm 20 | Gear reduction between motor 30 and contact arm 21 |
|---|---|---|
| 50 | 25 to 1 | 2400 to 1 |
| 75 | 25 to 1 | 1600 to 1 |
| 100 | 25 to 1 | 1200 to 1 |
| 125 | 25 to 1 | 960 to 1 |
| 150 | 25 to 1 | 800 to 1 |

The utility and advantages of the instrument of my invention will be readily understood by those skilled in the art, from the drawings and the foregoing description.

Changes may be made without departing from the invention.

Having described my invention, I claim:

The combination with a load circuit, of a constant speed motor, a second motor whose speed varies in proportion to the current consuming load of said circuit, a rotatable contact arm, connections between said arm and the constant speed motor for effecting rotative movement of the arm, a second contact arm rotatable on a common axis with the first arm, connections between the second arm and second motor for effecting rotative movement of the second arm in the same direction as the first arm, a portion of one of the arms being disposed in the same path of movement as the other arm for engagement with the latter, responsive means operable upon engagement of the arms, a third arm fixed on the connections between the first motor and arm for rotation in unison with said first arm, an arcuate scale on the free end of the third arm concentric to the axis of rotation of the first and second arms and with the scale of which said first and second arms cooperate, and means permitting manual relative angular adjustment of the arms toward and away from each other.

In witness whereof, I hereunto subscribe my name.

ROY C. FRYER.